(No Model.)  5 Sheets—Sheet 1.

C. N. DUTTON.
WATER CLOSET.

No. 280,018.  Patented June 26, 1883.

WITNESSES:  
Wm. A. Skinkle  
Geo. W. Breck

INVENTOR:  
Chauncey N. Dutton,  
By his Attorneys,  
Baldwin, Hopkins & Peyton.

(No Model.)

C. N. DUTTON.
WATER CLOSET.

No. 280,018.  Patented June 26, 1883.

5 Sheets—Sheet 2.

WITNESSES:
Wm A. Skinkle,
Geo. W. Breck.

INVENTOR:
Chauncey N. Dutton,
By his Attorneys,
Baldwin, Hopkins, & Peyton.

(No Model.)  5 Sheets—Sheet 3.

C. N. DUTTON.
WATER CLOSET.

No. 280,018. Patented June 26, 1883.

WITNESSES:
Wm. A. Skinkle,
Geo. N. Breck.

INVENTOR:
Chauncey N. Dutton,
By his Attorneys,
Baldwin, Hopkins, & Peyton.

(No Model.)  5 Sheets—Sheet 4.

C. N. DUTTON.
WATER CLOSET.

No. 280,018.  Patented June 26, 1883.

WITNESSES:
Wm A. Skinkle
Geo. W. Buck

INVENTOR:
Chauncey N. Dutton,
By his Attorneys,
Baldwin, Hopkins & Peyton (No Model.) 5 Sheets—Sheet 5.
C. N. DUTTON.
WATER CLOSET.
No. 280,018. Patented June 26, 1883.
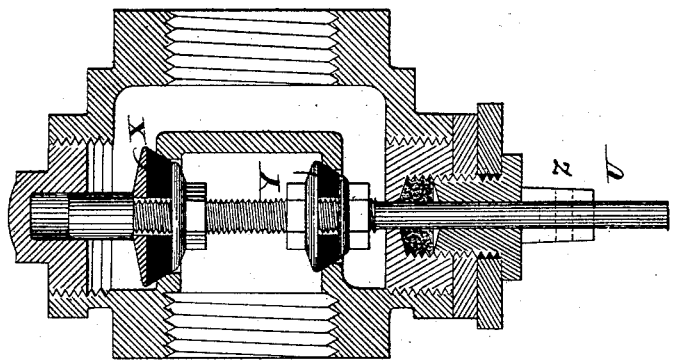
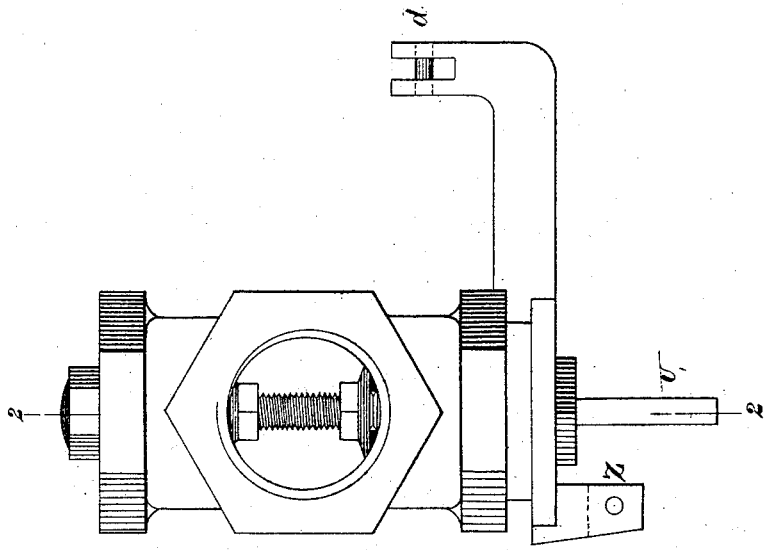
WITNESSES:
Wm. A. Skinkle,
Chas. H. Baker.
INVENTOR:
Chauncey N. Dutton,
By his Attorneys,
Baldwin, Hopkins, & Peyton.

UNITED STATES PATENT OFFICE.

CHAUNCEY N. DUTTON, OF WASHINGTON, DISTRICT OF COLUMBIA, ASSIGNOR OF ONE-HALF TO THOMAS WILSON, OF SAME PLACE.

WATER-CLOSET.

SPECIFICATION forming part of Letters Patent No. 280,018, dated June 26, 1883.

Application filed July 19, 1880. Renewed August 30, 1881. Again renewed February 23, 1883. (No model.)

*To all whom it may concern:*

Be it known that I, CHAUNCEY N. DUTTON, of the city of Washington, and District of Columbia, have invented certain new and useful Improvements in Water-Closets, of which the following is a specification.

My invention relates to improvements upon a water-closet invented by myself and Thomas Wilson, jointly, and patented in the United States of even date herewith.

My improvements relate, first, to the form of the hopper; second, to the construction of the discharge-valve; third, to the appliances for operating the inlet-valve and distributing the wash; and, fourth, to the construction of the cap or rim of the hopper.

Figure 1:
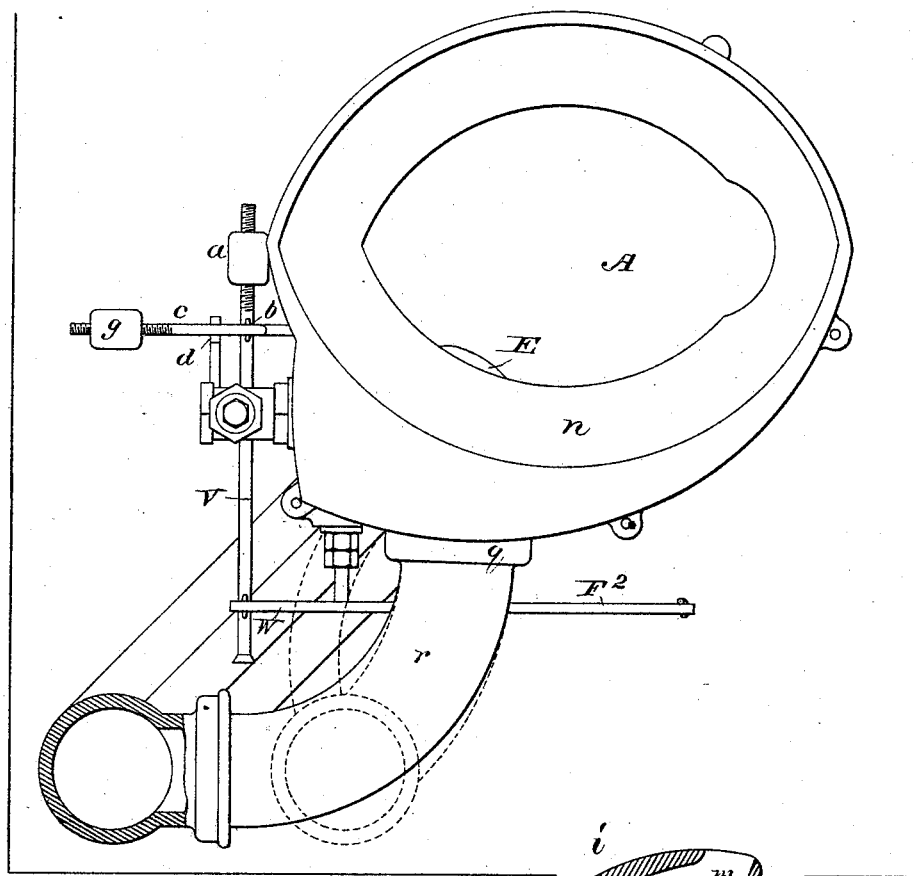
Figure 5:
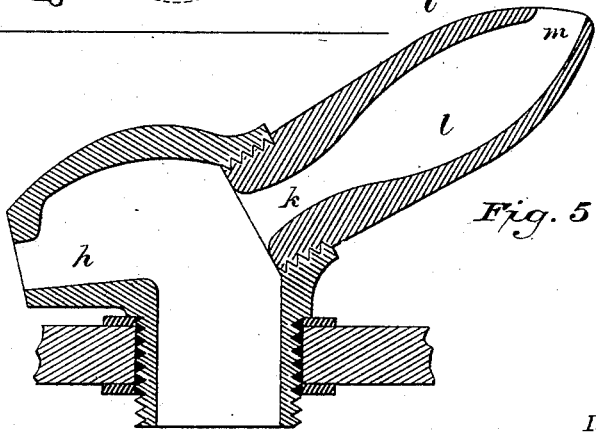
Figure 2:
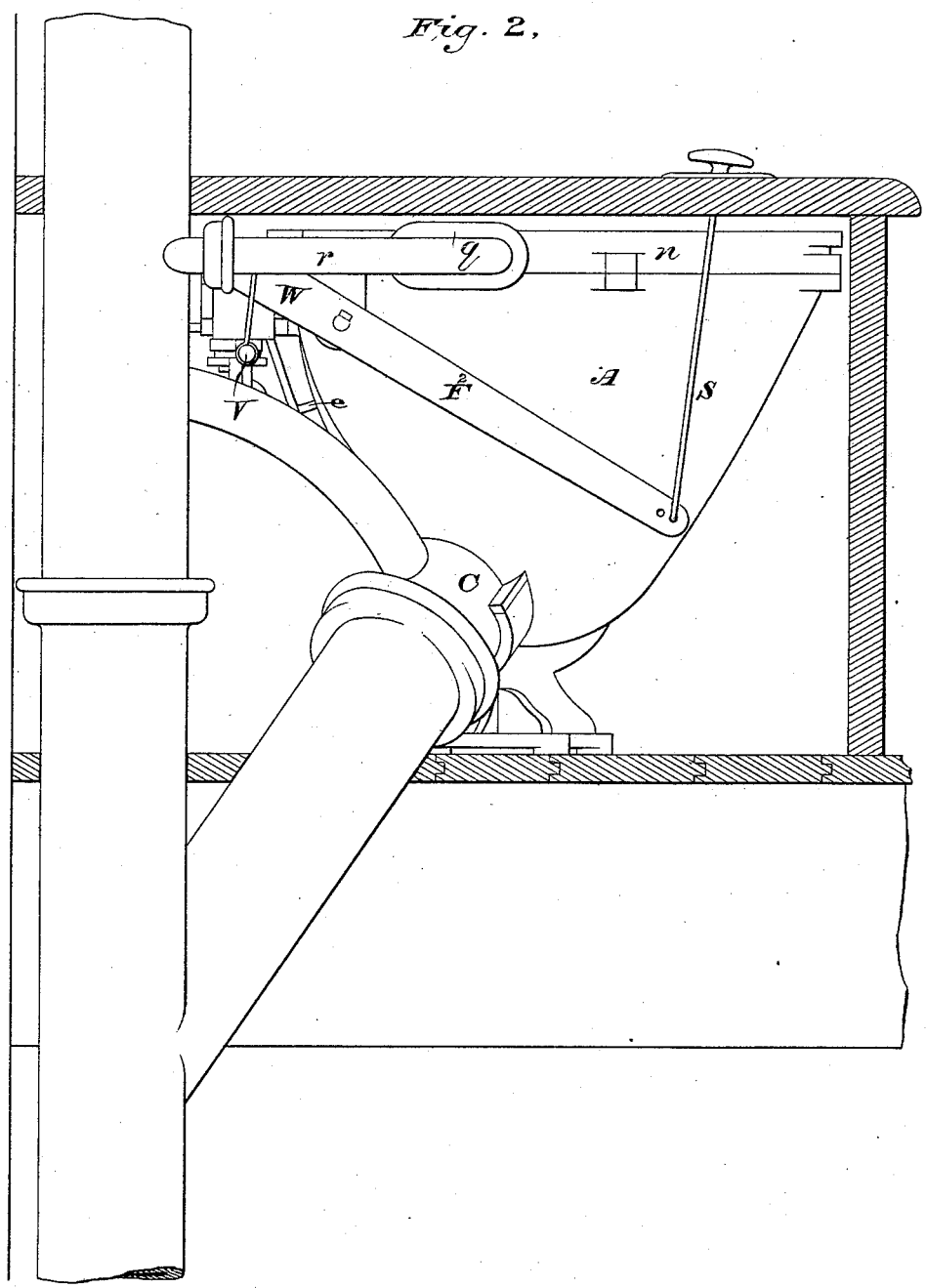
Figure 3:
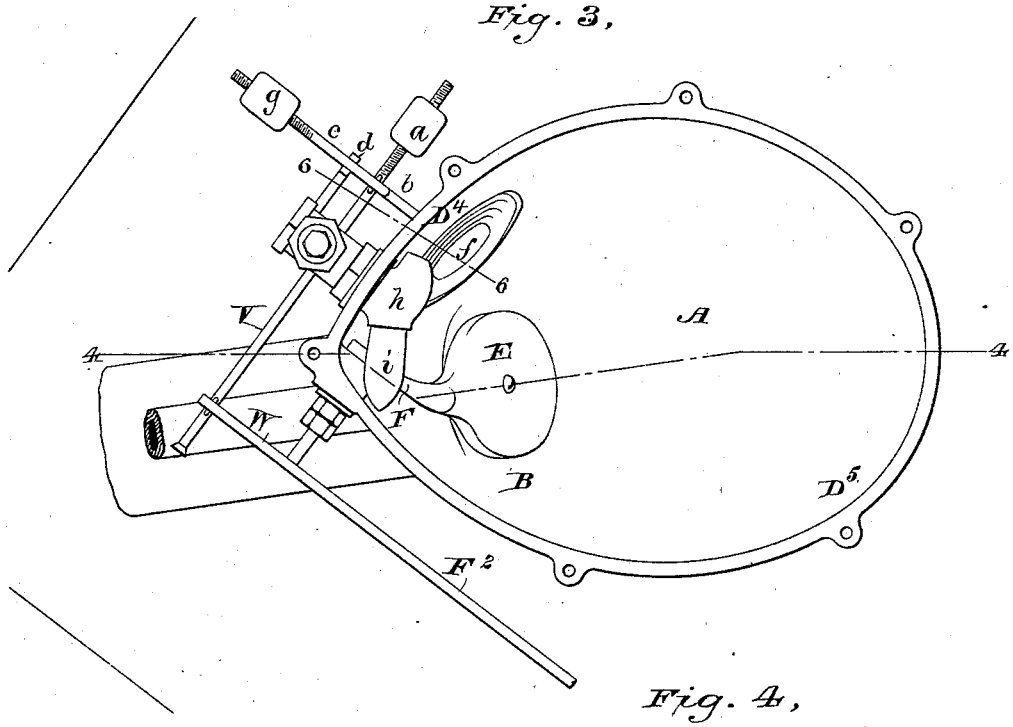
Figure 4:
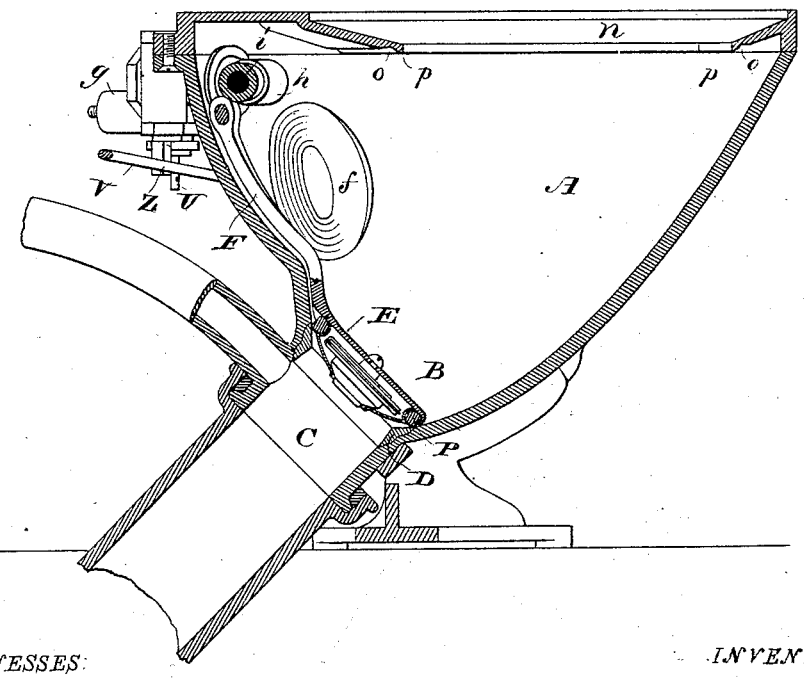
Figure 6:
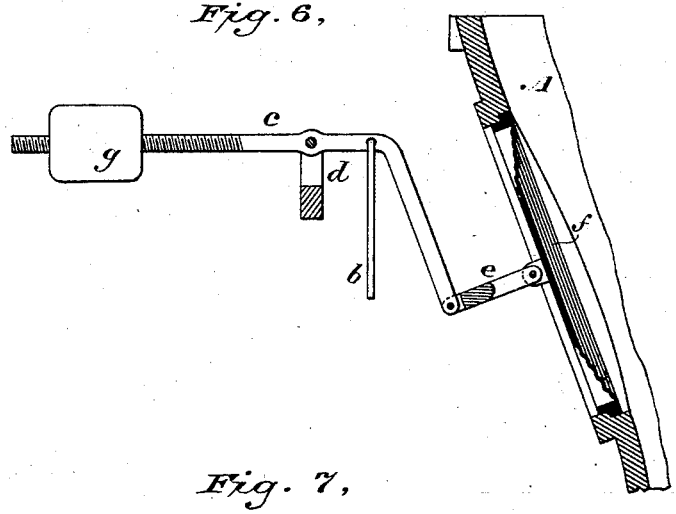
Figure 7:
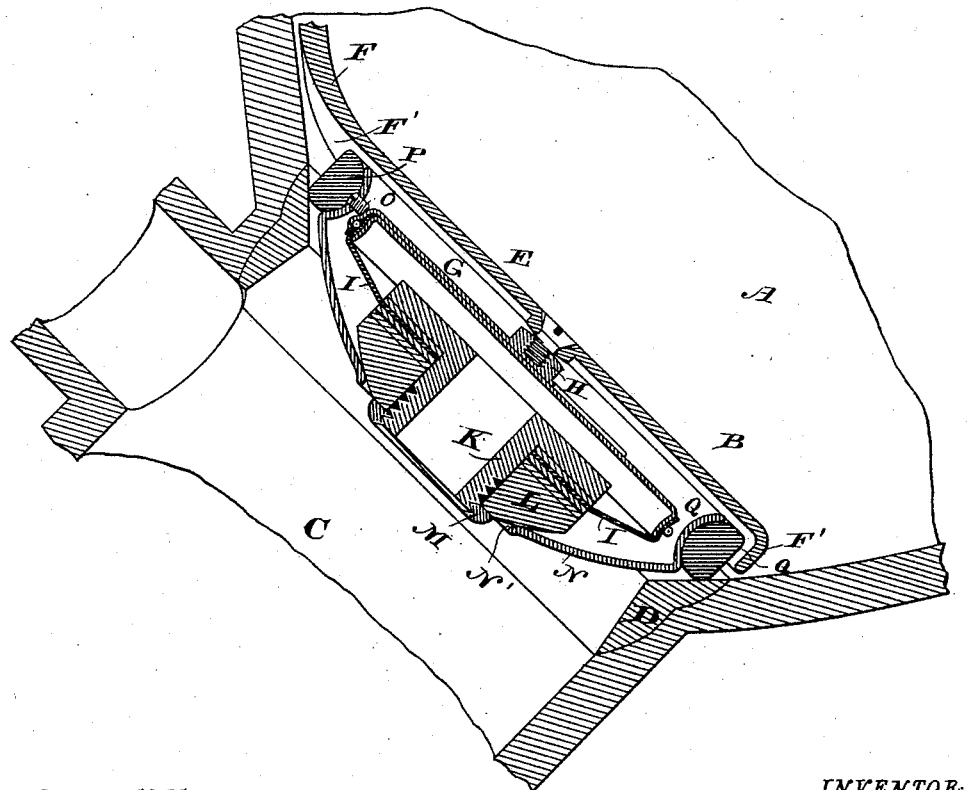

In the accompanying drawings, which illustrate my improvements, Figure 1 is a plan view of the closet. Fig. 2 is a side elevation, partly in section. Fig. 3 is a plan view with the cover and slop-safe removed. Fig. 4 is a vertical section through the line 4 4 of Fig. 3. Fig. 5 is an enlarged central section of the spreader. Fig. 6 is a view of the automatic inlet-valve-operating mechanism, partly in section through the line 6 6 of Fig. 3. Fig. 7 is an enlarged vertical section of the discharge-valve, seated in place, on the line 4 4 of Fig. 3; and Figs. 8 and 9 are enlarged views of the inlet-valve.

A indicates the hopper, in form somewhat like an inverted conical vessel, the interior shape or contour of which is such that any horizontal section-line is composed of a helix from $D^4$ to $D^5$, (or that portion of the hopper over which the principal wash flows,) at which latter point it is tangential to a helix in a reversed position, completing the horizontal section. Thus I form such a converging surface that the natural differential of flowing water or the wash from the desired direction will be corrected by the differential of the section-line. In other words, the tendency of the water of the wash to descend will be materially resisted.

The object of giving the interior of the hopper this shape is that the flow of water from the spreader impinging against the inner surface of the hopper may be continued round as far as possible under a given pressure with as little deviation as may be from the desired direction. Toward the lower part of the hopper the sides converge to the discharge-opening B, as shown in the drawings, so as to offer no obstruction to the free discharge of the contents; and the inner surface of the outlet C is a smooth circular continuation of that of the bowl and discharge-opening. Where the inside surface of the bowl merges into that of the discharge-opening an annular recess is formed to receive the annular valve-seat D, of celluloid or other suitable non-corrosive material, to be made with sufficient body, and cemented or otherwise secured in place, with its plane suitably inclined to the axis of the apparatus.

The discharge-valve is secured at its center by means of a set-screw or otherwise to the circular disk or face-plate E, which is secured to or forms a continuation of the valve-operating lever F, and has its edges turned down, as at F', to stiffen it and prevent fouling of the working parts beneath. This valve is composed of a disk, G, provided with a fixed screw-nut, H, a flexible diaphragm, I, a tubular ball-support, K, and a ball or globe, L, held in place by a nut, M, or by any other suitable means. The flexible diaphragm is secured around the periphery of the disk G and to the ball-support K in any suitable manner, so as to form water-tight joints. These parts are contained within a circular concavo-convex plate, N, having an opening or ball-seat, N', and are secured there by means of set-screws O, or otherwise. An annular groove is formed around the periphery of the plate N, in which is held an elastic ring, P. It will be seen by a reference to Fig. 7 of the drawings that when this valve is in place in the discharge-opening the ball L will rest in its seat N' by force of its gravity, and the elastic ring P will rest upon its seat D by force of the gravity of all the parts of the discharge-valve and of the water in the hopper, forming water-tight joints. The single set-screw fastening at the center of the disk G will admit of slight tilting or rocking movement of the valve under pressure to adjust it accurately in the seat D. Primarily the discharge-valve operates as an ordinary plunger or puppet valve; but it will be perceived that there is a passage, Q, through which water may flow inward around the ball-valve, and when a sufficient quantity of water is in the hopper to create an upward pressure upon the ball more than equal to its gravity it will be raised and permit an overflow at N' until the pressure is reduced so that the ball will fall back into its seat. The ball may be made to accommodate various pressures by altering its weight or the area of its overstanding surface. Thus the discharge-valve combines the elements and functions of a plunger or puppet, and of an automatic overflow or safety valve.

The object in having the ball-support tubular, or, at least, provided with an opening extending from the upper surface of the flexible diaphragm I down through the ball, is that confined air may not obstruct the movements of the diaphragm, and that any water leaking through it may escape.

The operation of the lever $F^2$ by means of the pull-rod S raising the discharge-valve in an oblique direction, so as to encounter the wash, as set forth in the said joint patent, will simultaneously operate the inlet-valve in the usual way to, permit a flow of water into the hopper to form the wash, the inlet-valve rod U being connected by means of a lever, V, with an extension, W, of the lever $F^2$, so that the valves X and Y may be opened and closed.

In order to provide an automatic means for operating the inlet-valve—which is preferably a balance-valve—and to dispense with the usual ball-valve apparatus, the lever V, pivoted at Z, extends past the point of pivotal connection with the valve-rod to the opposite side of the rod, where it is provided with an adjustable weight, $a$, in order to balance the lever V. This extension of the lever V, I connect by means of a pivoted link, $b$, with a bent or angular lever, $c$, pivoted in a proper support at $d$, and connected at its inner end by means of a link, $e$, with a flexible diaphragm, $f$, secured water-tight in one side of the hopper, preferably near its top.

This diaphragm may be made of any suitable material, such as leather, rubber, thin ductile metal with annular corrugations, or any artificial compound.

The angular lever $c$ is provided with an adjustable weight, $g$, which tends to press the flexible diaphragm inward and to elevate the extension of the lever V and keep the inlet-valve open. As the water is thus admitted into the hopper and rises against the diaphragm, it will overcome the force of the weight $g$, press the diaphragm outward, and operate the lever $c$ so as to close the inlet-valve and shut off the water from the hopper. These automatic valve-operating parts may be so adjusted with respect to the ball-valve that when the water has risen in the hopper higher than necessary to fully operate the diaphragm by pressure against it the water will then have sufficient pressure also upon the ball-valve to raise it and permit an overflow. The result is that an equilibrium of the inlet-valve and the overflow-valve will very soon be reached automatically, which will keep the hopper well filled with fresh water.

In order to have the wash thrown in opposite directions into the hopper, impinge against its sides, and meet at the proper point to thoroughly cleanse the discharge-valve or the face-plate E, I provide a spreader, not only with different-sized outlets, as is usual, but with one of its branches peculiarly constructed, as best illustrated in Fig. 5, where $h$ indicates an outlet of ordinary construction, which will give a greater throw of the water, and $i$ an outlet of peculiar construction, which will give a lesser throw. In this latter branch of the spreader, $k$ indicates an opening from the supply-pipe of given diameter, to be regulated according to the quantity of water desired. $l$ indicates an enlargement or reservoir, and $m$ an exit-opening of greater dimension than that marked $k$. The result of forming this branch with this reservoir and these different-sized openings is that the velocity of the water thrown by it will be materially reduced, so as to meet the throw of the water from the opposite branch of the spreader less than half way round the hopper at the proper point to overflow and cleanse the discharge-valve.

I provide a detachable open cap or slop-safe, $n$, for the hopper, with a circular groove, $o$, near its inner margin, leaving a drip-ledge, $p$. This construction prevents the slops from running under near the top of the hopper and adhering above the course of the wash. As the cap is held in place either by gravity or by means of screws and lugs, it will be easy to remove it to clean it or the hopper.

Although in the joint patent heretofore referred to the escape of sewer exhalations up through the hopper is provided against, yet there are always more or less exhalations from the hopper itself when in use; and in order to carry off such exhalations I provide an outlet, $q$, in the cap, connected by means of the pipe $r$ directly with the ventilating or soil pipe, so that the hopper itself will be thoroughly ventilated.

Having thus described the construction and operation of my improvements, what I claim as new, and desire to secure by Letters Patent, is—

1. The water-closet hopper of the internal shape described—that is to say, of an internal converging form, any horizontal section-line of which is composed of a helix from $D^4$ to $D^5$, at which latter point it is tangential to a helix in a reversed position, completing the horizontal section, whereby the natural tendency of the water of the wash to descend is resisted, and thus the water is made to flow around on the inner surface of the hopper, substantially as described.

2. The combination of the protecting face-plate E, having its edges turned down, with the discharge-valve centrally secured to it, so as to admit water between the two, substantially as and for the purposes described.

3. The combination of the concavo-convex plate N, provided with a ball-seat, N', and carrying the elastic ring P, with the annular valve-seat D and the hopper, substantially as described.

4. The combination of the disk G, the flexible diaphragm I, the tubular ball-support K, and the ball L, supported by and within the concavo-convex plate N, substantially as described.

5. The combination, in the discharge-valve, of a plunger or puppet valve and an overflow or safety valve, substantially as described.

6. In combination with the pull-rod, operating-lever, and inlet-valve of a water-closet, an automatic inlet-valve-operating mechanism directly connected with the operating-lever, substantially as and for the purposes described.

7. The combination, with a hopper or container, of a flexible diaphragm, $f$, normally resting or projecting inward, but adapted to be pressed outward by the contents, substantially as described.

8. The combination of a flexible diaphragm, $f$, in the side of a hopper, the inlet-valve, and a weighted lever and link-connections between the two, substantially as described.

9. The combination of the inlet-valve and flexible diaphragm $f$ and their operative connecting parts with the hopper and the automatic ball-valve of the discharge-valve, substantially as described.

10. The combination, in a water-closet hopper, of an automatic inlet-valve-operating mechanism, and an automatic discharge-valve within the hopper, constructed and operating substantially as described, whereby any desired quantity of water may be admitted into the hopper and maintained there, substantially as described.

11. The slop-safe $n$, provided with the groove $o$ and drip-ledge $p$, in combination with the hopper, substantially as described.

12. The combination of the hopper, the slop-safe provided with the outlet $q$, and the ventilating-pipe $r$, substantially as described.

In testimony whereof I have hereunto subscribed my name.

CHAUNCEY N. DUTTON.

Witnesses:
 MARCUS S. HOPKINS,
 JAMES R. SEVERANCE.